(12) United States Patent
Whittington, III (10) Patent No.: US 10,166,446 B2
(45) Date of Patent: Jan. 1, 2019

(54) COLLECTION CONTAINER FOR BROKEN GOLF TEES

(71) Applicant: Perry B. Whittington, III, Charlotte, NC (US)

(72) Inventor: Perry B. Whittington, III, Charlotte, NC (US)

( * ) Notice: Subject to any disclaimer, the term of this patent is extended or adjusted under 35 U.S.C. 154(b) by 0 days.

(21) Appl. No.: 15/678,321

(22) Filed: Aug. 16, 2017

(65) Prior Publication Data

US 2018/0050246 A1 Feb. 22, 2018

Related U.S. Application Data

(60) Provisional application No. 62/376,475, filed on Aug. 18, 2016.

(51) Int. Cl.
| | |
|---|---|
| *A63B 57/00* | (2015.01) |
| *A63B 57/20* | (2015.01) |
| *B65D 81/02* | (2006.01) |
| *B65D 81/26* | (2006.01) |
| *B60R 7/06* | (2006.01) |
| *B60N 3/08* | (2006.01) |
| *B60R 11/00* | (2006.01) |
| *A63B 102/32* | (2015.01) |
| *A63B 55/00* | (2015.01) |

(52) U.S. Cl.
CPC ............. *A63B 57/203* (2015.10); *B60N 3/08* (2013.01); *B60R 7/06* (2013.01); *B65D 81/022* (2013.01); *B65D 81/261* (2013.01); *A63B 55/408* (2015.10); *A63B 2102/32* (2015.10); *A63B 2209/10* (2013.01); *A63B 2210/50* (2013.01); *B60R 2011/0005* (2013.01); *B60R 2011/0059* (2013.01); *B60R 2011/0066* (2013.01)

(58) Field of Classification Search
CPC . A63B 57/203; A63B 55/408; A63B 2102/32; A63B 2209/10; A63B 2210/50; B60N 3/08; B60R 7/06; B60R 2011/0005; B60R 2011/0059; B60R 2011/0066; B65D 81/022; B65D 81/261
USPC ......................................................... 224/274
See application file for complete search history.

(56) References Cited

U.S. PATENT DOCUMENTS

| | | | | |
|---|---|---|---|---|
| 4,989,767 A | * | 2/1991 | Buschbom | ............. B60N 3/103 224/274 |
| 5,159,314 A | * | 10/1992 | Wayne | ................... B60K 35/00 180/69.2 |
| 6,582,002 B2 | | 6/2003 | Hogan et al. | |

(Continued)

*Primary Examiner* — Peter Helvey
(74) *Attorney, Agent, or Firm* — F. Rhett Brockington (57) ABSTRACT

The current embodiment of the broken golf tee collection container is designed to elevate over the dashboard of a golf cart or a similar vehicle using attachment brackets and can be easily removed and reattached. The container has a bottom with slots for water to drain. The angled or vertical sides and the open top design of the container makes it easy to store and to remove broken golf tees, as needed. The top portions of the attachment brackets are secured to the left and right edges on the bottom part of the container and support the container in an almost level position above the dashboard. The lower portion of the attachment brackets are a rotated block "U" shape, which slides onto and over the dashboard to secure the container and contents during the normal operation of the golf cart.

14 Claims, 7 Drawing Sheets

(56) References Cited

U.S. PATENT DOCUMENTS

| | | | |
|---|---|---|---|
| 6,601,745 B2 * | 8/2003 | Tyrer | B60N 2/24 |
| | | | 224/274 |
| 6,869,120 B2 * | 3/2005 | Johnson, Jr. | B60R 7/06 |
| | | | 224/274 |
| 6,874,836 B1 * | 4/2005 | Feser | B60N 3/08 |
| | | | 220/839 |
| 8,091,749 B2 * | 1/2012 | Stautzenberger, Sr. | B60R 9/00 |
| | | | 224/274 |

* cited by examiner

COLLECTION CONTAINER FOR BROKEN GOLF TEES

CROSS-REFERENCES TO RELATED APPLICATIONS

The present patent application/patent claims the benefit of priority of U.S. Provisional Patent Application No. 62/376,475, filed on Aug. 18, 2016, and entitled "BROKEN TEE COLLECTION TRAY", the contents of which are incorporated in full by reference herein.

BACKGROUND OF THE INVENTION

1. Field of the Invention

The present invention relates to containers, and more particularly to an apparatus for holding collected golf tees, wherein the apparatus can be clipped onto the dashboard or another part of a golf cart or a similar vehicle.

2. Background

Broken golf tees, left on the tee box, are a problem that has not been solved. Plastic golf tees have been introduced to help lessen the problem. Biodegradable golf tees are being introduced. Broken golf tees are still being left on the tee boxes that have to be picked up by the maintenance staff of the golf courses. This is time consuming and costly to the courses and unsightly for players. The current options available, based on prior art, are broken golf tee collection containers of different sizes and shapes that are designed to be placed on the tee box. In some cases these collection containers are placed on the grass. In other cases the collection containers are attached to a sharp object that is stuck in the grass at the tee box. U.S. Pat. No. 5,029,855 is an example of such a collection container. The players must pick up their broken golf tees from the tee box and bend over to place the tees in the collector that is located close to the ground. These collection containers have to be maintained and have to be picked up, along with the tees left around the collection container, in order to maintain the tee box, when mowing, seeding, or fertilizing. The maintenance schedule varies and can be once a day or longer, and between scheduled maintenances of the tee boxes there are broken golf tees being left on the tee boxes. If players tee off every eight minutes, you would have 60 groups or as many as 240 players tee off in an eight hour period. This creates the opportunity for a lot of broken golf tees to be left on the tee box.

The broken golf tees left on the tee box and the current solutions both create issues that the golf course has to deal with. Maintenance staff personnel indicate that current collection containers placed on the tee box can inadvertently damage the grass that is under the collection container. If the broken golf tees are not picked up, they can damage the blades of the mowers used to cut the grass. Current collection containers are also susceptible to being damaged by the players hitting them with their golf club. Broken golf tees left on the tee box, whether in a current collection container or not, distract from the course's natural beauty.

There are two other current options for the players to dispose of their broken golf tees. One is to put them in their pockets. Players generally keep only items they need to play with during the round in their pockets. They can break more tees than they need and don't want or need a lot of sharp broken golf tees in their pockets. Broken golf tees are generally used only on par threes. There are generally four par threes on an eighteen hole course. The second option is to place the broken golf tees in the compartments of the golf cart. The cart maintenance staff report that broken golf tees placed in the golf compartments are difficult and time consuming to get out, because broken golf tees are small and have sharp ends that make them difficult to pick out of a golf cart compartment.

Similarly players find that broken golf tees are difficult to get out of a pocket. There have been waste containers for golf carts, wherein waste is identified as items that have no further use after what was in them has been consumed. Waste containers have tops that keep the waste in, and insects out. Broken golf tees are re-used during the golf round and are not considered waste until the round is over. U.S. Pat. No. 6,582,002 to Hogan et al. teaches an assembly that can include a waste receptacle, drink holders, and places for golf balls and six horizontal holes to slide in place golf tees. The assembly is affixed to the rear of the face plate on the golf cart's dashboard. The waste receptacle is an enclosed container that is designed to hold multiple waste items. Any broken golf tees that might be placed in the assembly's waste receptacle would not be easily accessible for re-use, as the assembly's waste receptacle is appropriately sized for receiving a plurality of trash. Also, the horizontal holes that are indicated for golf tees are similar to other designs on carts for full length golf tees, and are not suited to hold broken golf tees, which are much shorter and not tipped. Broken golf tees typically have jagged edges and would not be retained in holes designed to receive smooth full length tees.

There are a lot of issues that the golf courses have to deal with if they use the options currently available for dealing with broken golf tees. This is because the current options don't offer any cost saving solutions. There can be 72 or more tee boxes (i.e., ladies, amateur men, professional men, seniors) on a golf course that need to be maintained. Dealing with golf tees that have been broken and left on the tee box, left in a tee box container on the tee box, or left in the compartment of a golf cart create a cost problem for the courses.

SUMMARY OF THE INVENTION

Broadly, the present invention is an apparatus for collecting broken golf tees utilizing a golf cart or a similar vehicle. A first object of the invention is that it can easily be detached and reattached to a golf cart, without the need of any tools.

A second object is that the apparatus retains the tees through all normal cart operations, but does allow water to be drained off.

A third object is that collected broken golf tees can easily be added to the collection container, which is an element of the apparatus, and that the tees are easily accessible for use by golfers.

A fourth object of the invention is that while the collection container retains golf tees, it will not secure most drink cans, bottles, paper plates, or food wrappers, and therefore will not likely become a waste container.

A fifth object of the invention is that the collection container is fitted with an assembly of attachment brackets, wherein specific attachment brackets have dimensions suitable for being elastically fitted onto a dashboard or another part of a golf cart or a similar vehicle. The attachment brackets have a form that is optimized to fit a specific position.

A sixth object of the invention is that it provides a method for collecting broken golf tees utilizing a golf cart or a similar vehicle from a golf course.

These and other objects and advantages of the present invention will be readily appreciable from the following description of preferred embodiments of the invention and from the accompanying drawings and claims.

BRIEF DESCRIPTION OF THE DRAWINGS

The foregoing invention will become readily apparent by referring to the following descriptions and the appended drawings in which.

DETAILED DESCRIPTION OF THE INVENTION

Illustrative embodiments and exemplary applications will be described with reference to the accompanying drawings to disclose the advantageous teachings of the present invention.

Various embodiments of the invention are described more fully hereinafter with reference to the accompanying drawings, in which some, but not all of the embodiments of the invention are shown in the figures. Indeed, these inventions may be embodied in many different forms and should not be construed as limited to the embodiments set forth herein; rather, these embodiments are provided so that this disclosure will satisfy applicable legal requirements. Those having ordinary skill in the art and access to the teachings provided herein will recognize addition.

The invention is an apparatus for collecting broken golf tees that is fitted onto a golf cart, or a similar vehicle. The apparatus includes a collection container composed of a resilient shock resistant material. The collection container has a planar bottom that provides dampened flexibility, wherein the bottom has a plurality of elliptical holes/slots that are sufficient in size and number to drain away rain water keeping the collection container free of standing water, yet small enough to retain any fractional element of the broken golf tees. The bottom also has a set of fastener openings, and contiguous with the bottom, there is a perimeter wall having sections that are inclined or vertical. Typically, the perimeter wall has a height that is at least one fifth as high as the bottom is wide, which is sufficient to retain broken golf tees at any slope angle that the golf cart is capable of traversing or at any operating acceleration or deceleration the golf cart is normally capable of operating.

The apparatus includes a clip-on suspension assembly of attachment brackets that are composed of a resilient elastic material, wherein each attachment bracket has a lower portion shaped similar to a counterclockwise rotated block "U" that is sized to elastically fit over and under a golf cart's dashboard or another part of a golf cart or a similar vehicle. The lower portion is contiguous with an upper portion shaped similar to a clockwise rotated block "L", wherein a leg on the "L" is about horizontal and has one or more bracket fastener holes that are aligned with one or more fastener openings on the bottom of the collection container, and the leg on the "L" extends rearward elevated over the golf cart's dashboard, wherein an angled section of the "L" functions as a cantilevered spring suspension support for the collection container.

The apparatus has a fastening means that attaches the collection container to a left attachment bracket and a right attachment bracket of the assembly of attachment brackets utilizing the bracket fastener holes and the set of fastener openings on the bottom of the collection container. The fastening means is selected from the group consisting of but not limited to dual lock fasteners, hook and loop, rivets, screws, bolts, brads, spring loaded mechanical fasteners, clamps, cable ties, glues, or a combination thereof.

The clip-on suspension assembly of attachment brackets allows for the apparatus to be removed and re-attached to the dashboard of the golf car or another part of a golf cart or a similar vehicle, therein enabling the collection container to be quickly emptied.

In one embodiment, the resilient shock resistant material of the collection container is ABS, which is a polymer comprised of acrylonitrile butadiene styrene.

The resilient elastic material of the clip-on suspension assembly of attachment brackets can be selected from but not limited to fiberglass, graphite fiber, plastic, thermoset, polymeric or metal. Metals, such as aluminum and stainless steel, and elastomeric materials such as ABS provide the elastic gripping force to the lower portion of the brackets to fasten the assembly of attachment brackets onto the dashboard or another part of the golf cart, and by extension provide the upper portion of the attachment brackets with spring suspension support. The upper portion of the attachment brackets supports the bottom of the collection container. Taken with the dampened flexibility of the bottom and the inertia of the collection container, the apparatus provides a very smooth, quiet ride, with very little vibration.

It is anticipated that the lower portion of the clip-on suspension assembly of attachment brackets can be designed to fit a golf cart or a similar vehicle with a modified dashboard or another part.

If used properly, the apparatus would be periodically emptied, and replaced by the maintenance staff.

The cost of collecting broken golf tees would be greatly reduced, as the apparatus provides an effective cost savings alternative to the current options available, therein solving how broken golf tees are collected, carried, re-used, and disposed of.

Figure 1:
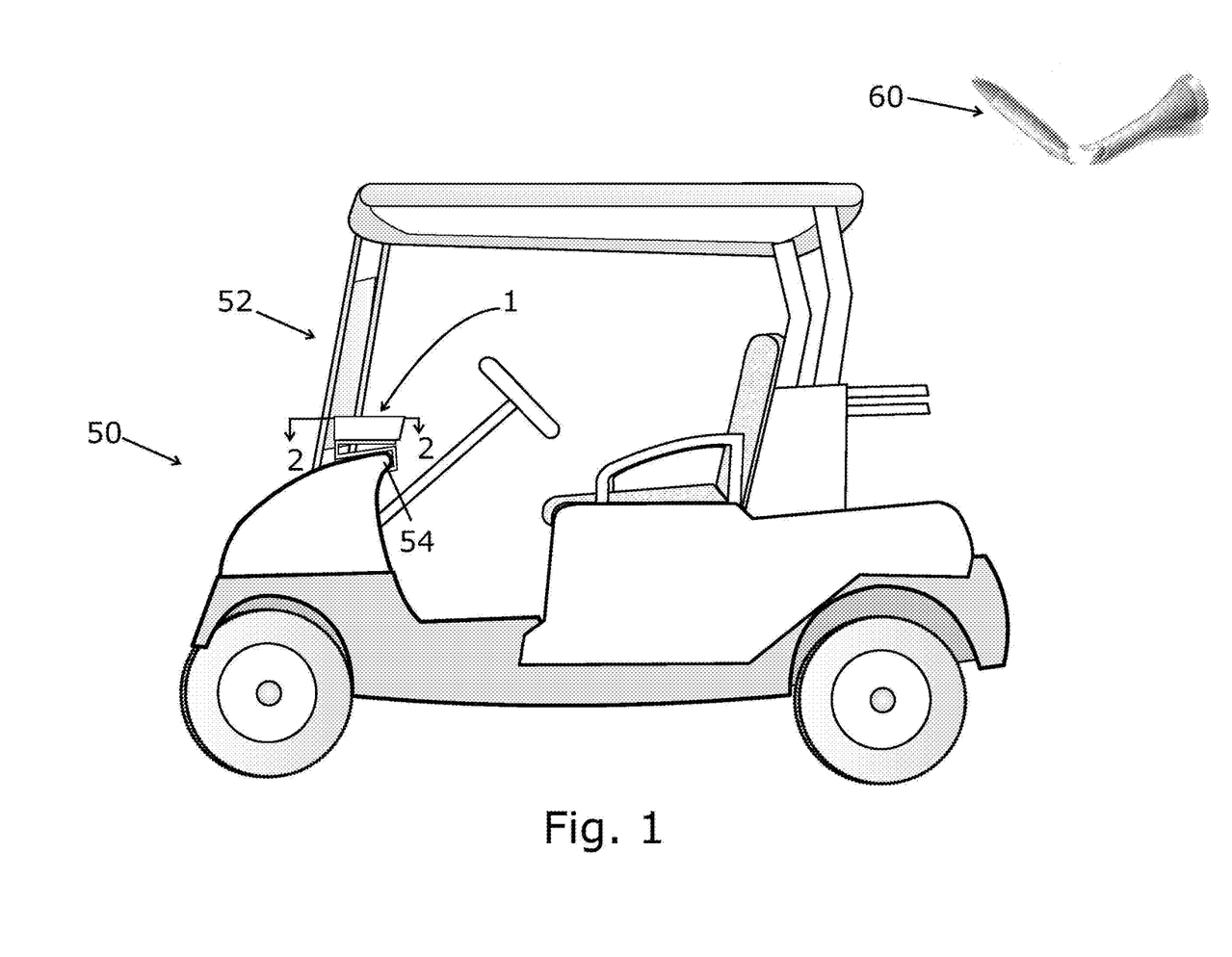
FIG. 1 is a side view illustrating the invented apparatus fitted onto to a golf car.

An embodiment of the invention is illustrated in FIG. 1. The apparatus 1 is attached to the dashboard 54 of the golf cart 50, just rearward of the windshield 52. Broken golf tees 60 are shown, enlarged, to the side of the cart 50. The numbers 2 indicated the sectional line in FIG. 2.

Figure 2:
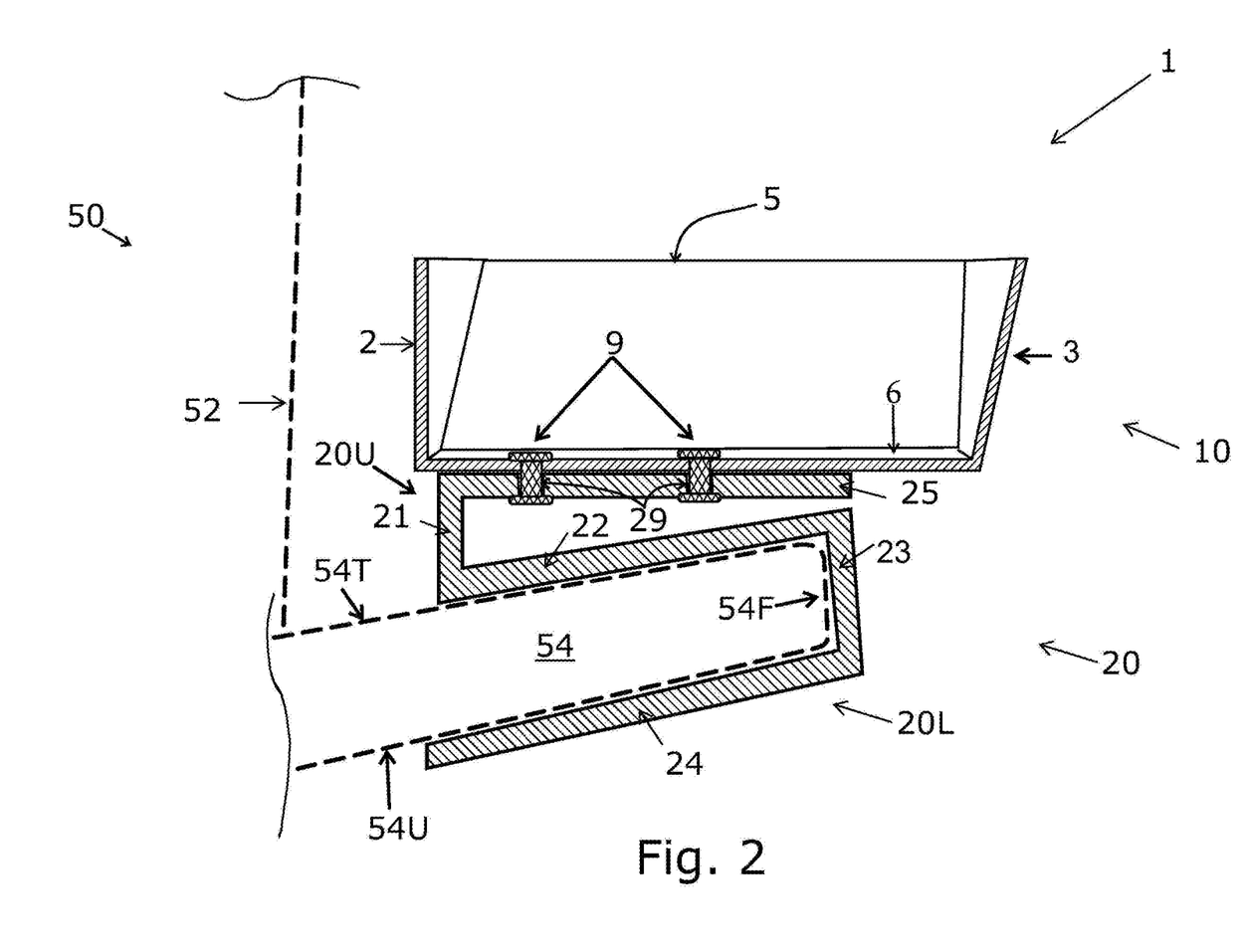
FIG. 2 is a cross-section side view taken along sectional line 2-2 in FIG. 1, illustrating the invented apparatus, wherein fastening elements affix the collection container to an upper portion of the illustrated attachment bracket that extends horizontally over the dashboard, and contiguous with the upper portion is a lower portion of the attachment bracket, which is elastically fitted over and under a sectional portion of the dashboard, wherein the dashboard and windshield of the golf cart are indicated by dashed lines.

The invented apparatus 1, as shown in FIG. 2, is composed of the collection container 10, which is mounted to the clip-on suspension of an assembly of attachment brackets 20, with fastening elements 9. The clip-on suspension assembly of attachment brackets for this embodiment of the collection container includes two attachment brackets, a left attachment bracket, which is shown, and a right attachment bracket on the opposite side of the container, which is not shown. The lower portion 20L of the illustrated left attachment bracket 20 functions as a clip, and it clips on a dashboard, or another suitable position of a golf cart or similar vehicle. As illustrated in the drawings, the lower portion 20L of the attachment bracket is fitted over and under the dashboard 54 of the golf cart 50 and if present, to the rear of the windshield 52 shown in dashed lines. The illustrated lower portion 20L is shaped substantially like a block "U" rotated counterclockwise about one hundred degrees from upright to conform to the angle of the illustrated dashboard. The lower leg of the attachment bracket 24 is on the underside 54U of the dashboard 54, the upper leg 22 is on the topside of the dashboard 54T, and the front edge side of the dashboard 54F is flush with the block "U" front 23. Upper leg 22 of the lower portion 20L is contiguous with vertical leg 21 of the upper portion 20U, which is shaped like a block "L" rotated clockwise about ninety degrees. The horizontal leg 25 of the upper portion 20U extends rearward towards the vertical leg 21, elevated above the golf cart's dashboard 54 and above upper leg 22 of the lower portion 20L. The "L" functions as a cantilevered spring suspension support for the collection container 10.

Figure 4:
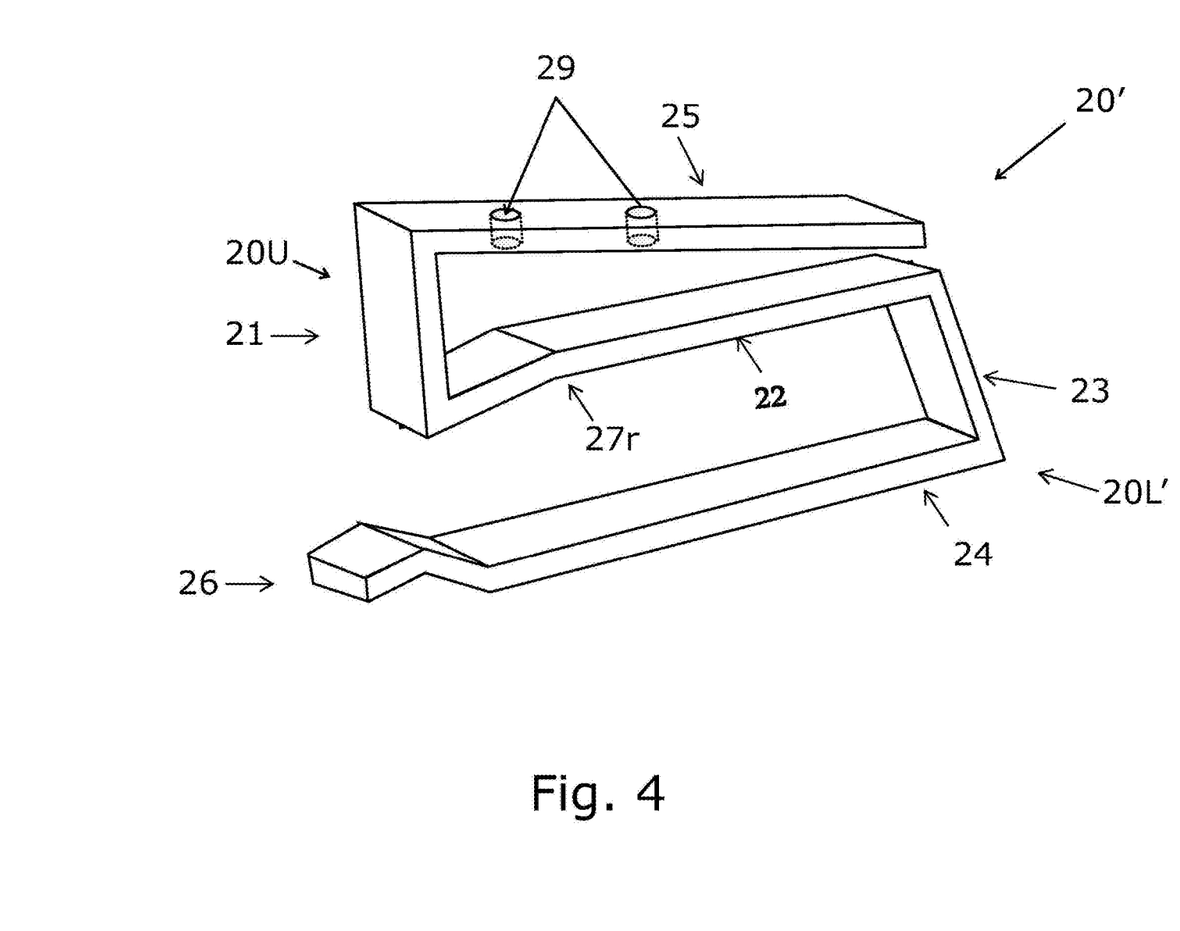
FIG. 4 is an elevated perspective view of another prototypical attachment bracket, wherein dashed lines are used to show in ghost the bracket fastener holes in the upper portion of the bracket, and the lower portion of the counterclockwise rotated block "U" that has an upper leg with a rearward indent.

The bottom 6 of collection container 10 is about flush with a top surface of horizontal leg 25. The bracket's fastening holes 29 are best viewed in FIG. 4. As previous indicated, the attachment bracket 20' in FIG. 4 is a prototypical attachment bracket, wherein dashed lines are used to show in ghost the bracket fastener holes 29 that are shown in FIG. 2. The bracket fastening holes 29 are located on the horizontal leg 25 in all embodiments of the upper portion 20U, when using rivets or binding fasteners, regardless of the shape of the lower portion 20L as shown in FIG. 2 and FIG. 7, and variously 20L' in FIG. 4, 20L" in FIG. 5, and 20L'" in FIG. 6.

In FIG. 2 three of the four sides (2, 3 and 5 in FIG. 3) are inclined sufficiently to retain golf tees, but are not designed to retain cylindrical objects like drink cans, paper products, or food wrappers that could attenuate drainage. The apparatus 1 is not a waste container, and its features deter such applications. Only side 2 is vertical. The height of the sides is about one fifth to one third the length of the collection container, again to discourage using it to carry waste.

Figure 3:
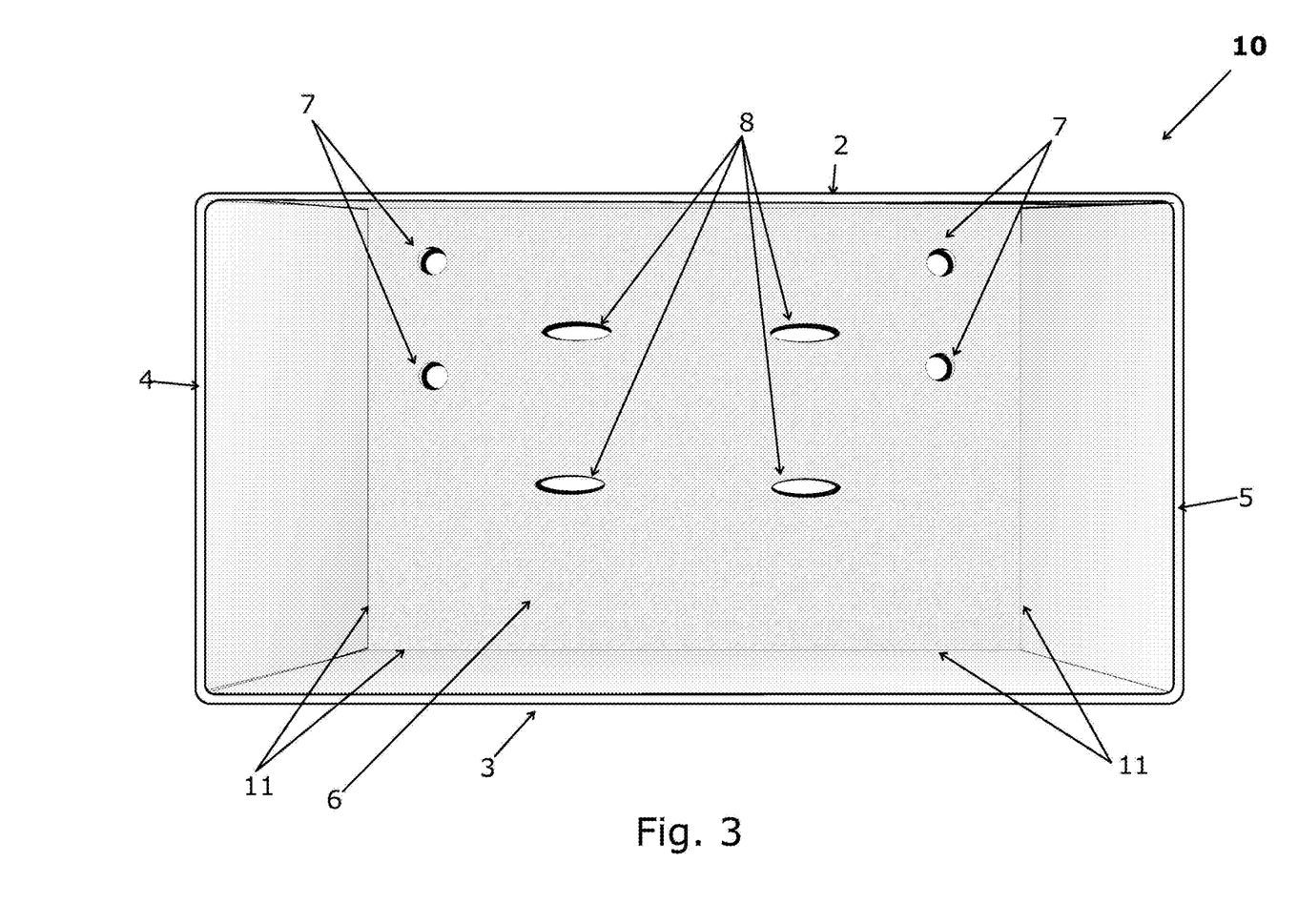
FIG. 3 is a top planar view of the collection container not fastened to attachment brackets, wherein in one of the preferred embodiments of the collection container's perimeter wall has three inclined sides and one vertical side, four drainage holes, and four holes for the fasteners used to attach the container to the upper portion of the attachment brackets.

FIG. 3 is a top planar view of the collection container 10 not fastened to the attachment brackets. The bottom 6 has three inclined sides 3,4,5 and one vertical side 2. Fold lines 11 for the sides of the collection container are indicated. There are four drainage holes/slots 8, and four openings 7 for the fasteners 9 (in FIG. 2) used to attach the container 10 to the horizontal leg 25 of the upper portion 20U of the attachment brackets 20, also shown in FIG. 2. Other potentially suitable attachment brackets 20', 20" and 20'" are respectively illustrated in FIG. 4, FIG. 5 and FIG. 6.

In FIG. 4 the attachment bracket 20' has a lower portion 20L', wherein the lower leg 24 has an angled extension 26 and the upper leg 22 has a rearward indent 27r. Leg 23 connects legs 22 and 24. The upper portion 20U is comprised of a horizontal leg 25, indicating the fastening holes 29 used to attach the container, and a vertical leg 21. The lower portion of the bracket attaches to the golf cart and the upper portion attaches to the collection container.

Figure 5:
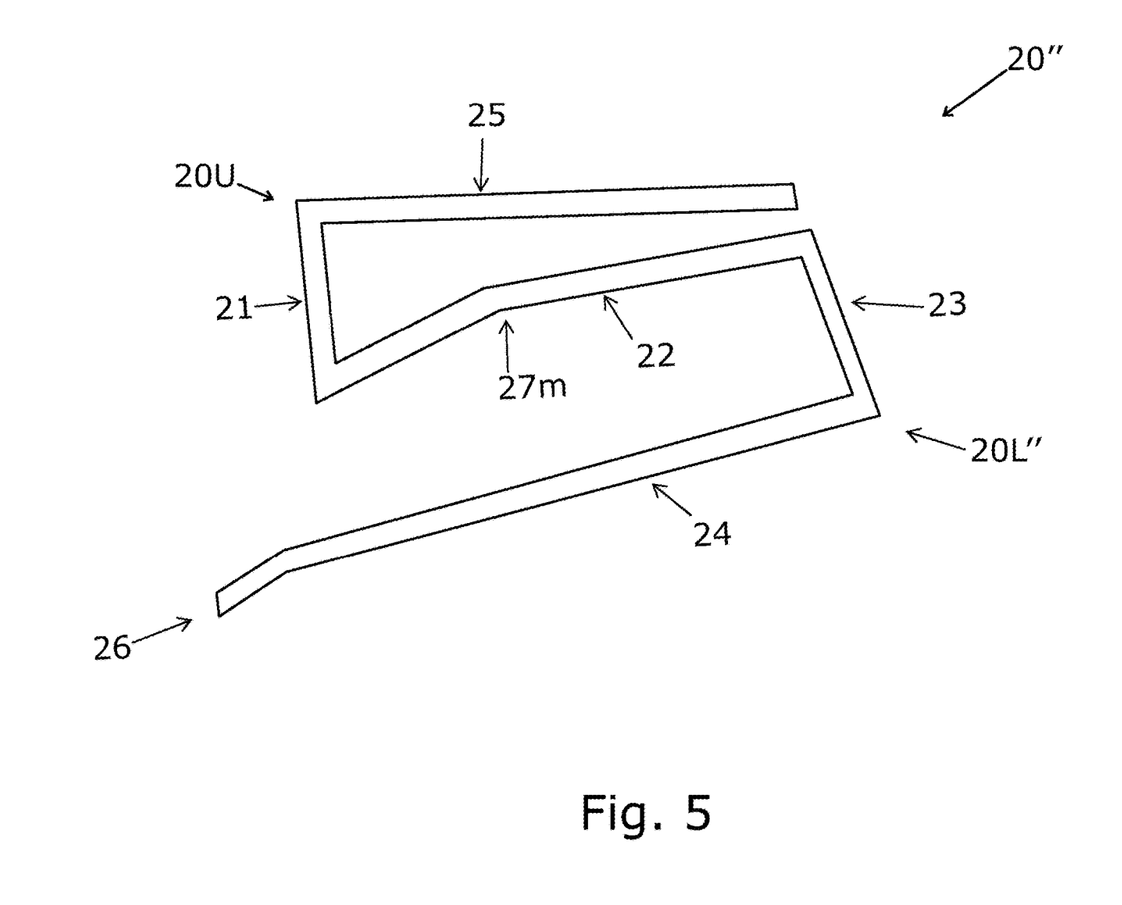
FIG. 5 is a plan side view of the upper and lower portions of the attachment bracket, wherein the lower portion of the counterclockwise rotated block "U" has an upper leg with a medial indent in an upper leg, and the lower leg has an angled extension.

FIG. 5 is a plan side view of attachment bracket 20", wherein the upper leg 22 of the lower portion 20L" of the attachment bracket has a medial indent 27m. The angled extension 26 of the lower leg 24 of lower portion 20L" is less pronounced, than the angled extension 26 in FIG. 4. Leg 23 connects legs 22 and 24. The upper portion 20U is comprised of a horizontal leg 25 and a vertical leg 21. The lower portion of the bracket attaches to the golf cart and the upper portion attaches to the collection container.

Figure 6:
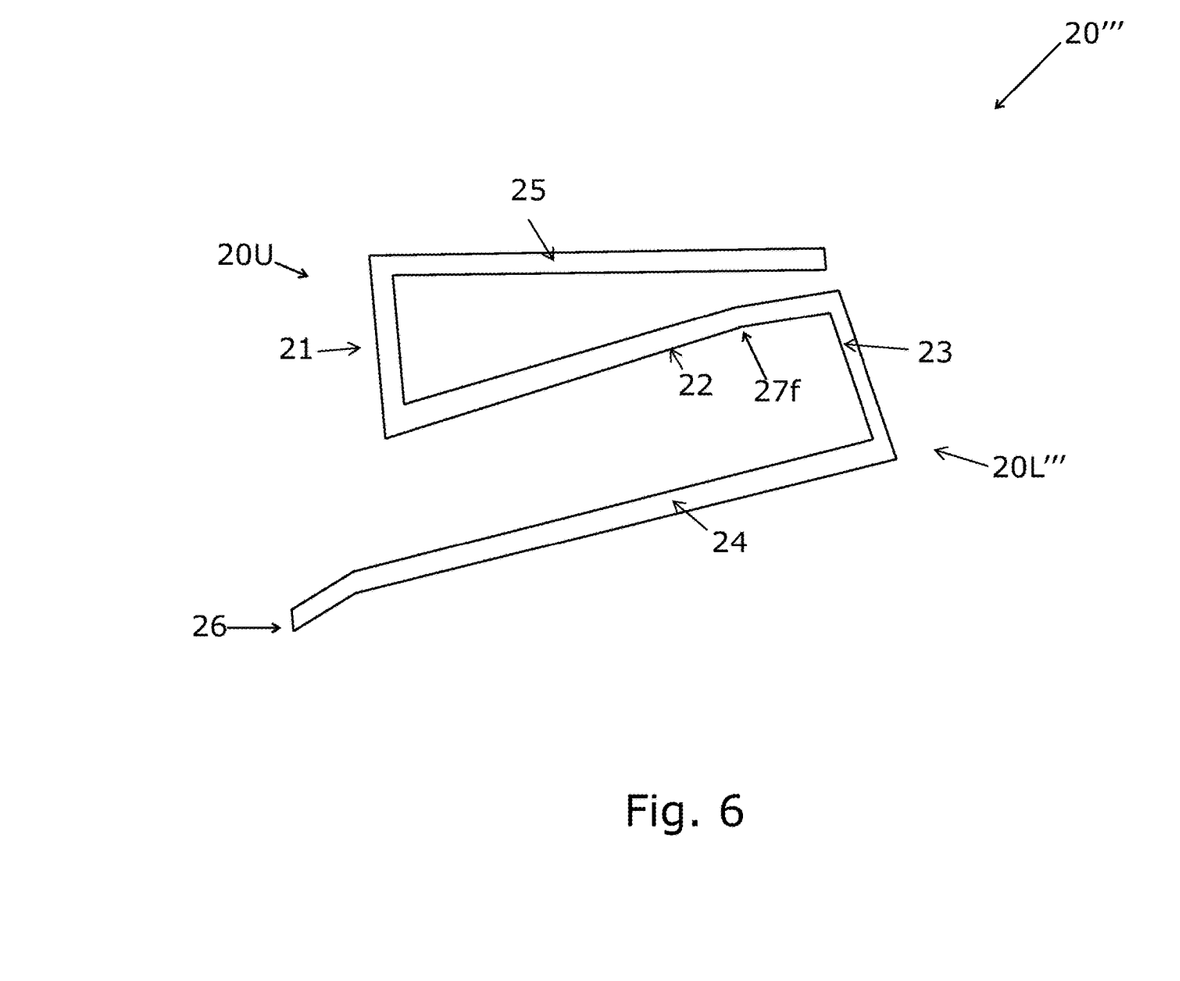
FIG. 6 is a plan side view of the upper and lower portions of the attachment bracket, wherein the lower portion of the counterclockwise rotated block "U" has an upper leg with a forward indent that is proximate to a front leg, and a lower leg has an angled extension.
Figure 7:
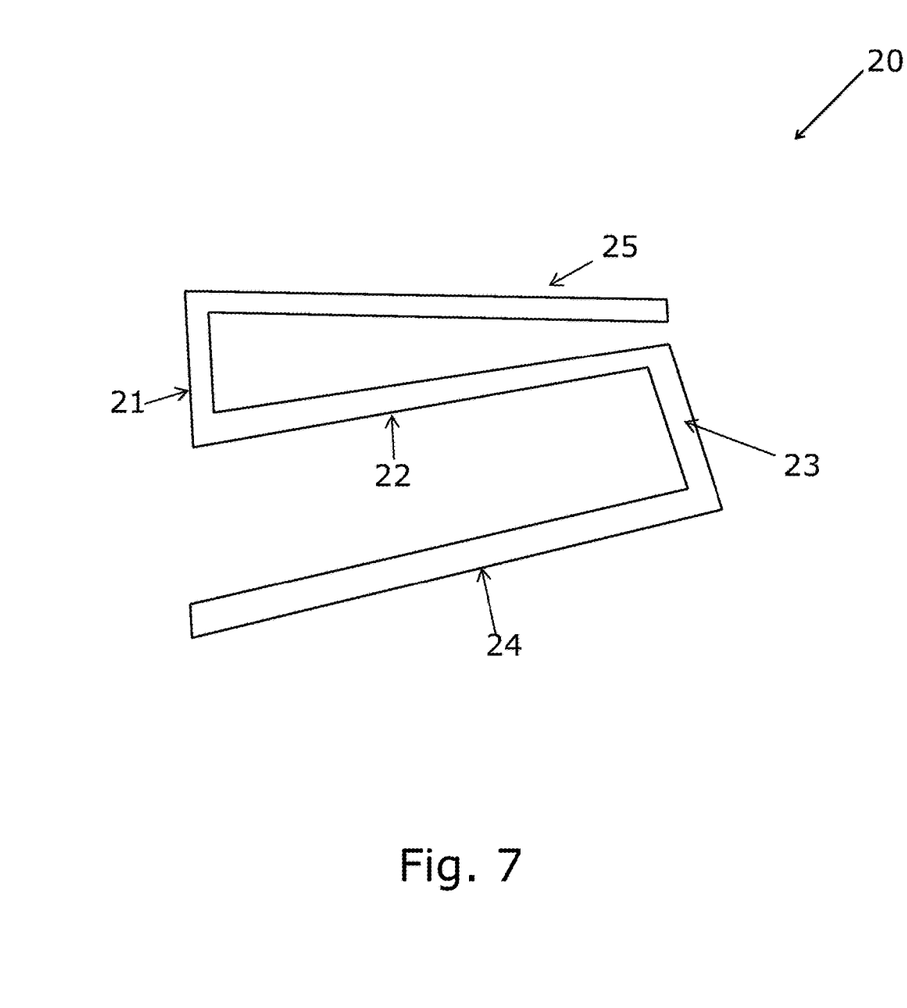
FIG. 7 is a plan side view of the upper and lower portions of the attachment bracket, wherein the lower portion of the counterclockwise rotated block "U" has a straight lower leg, also shown in FIG. 2.

FIG. 6 is a plan side view of an attachment bracket 20'", wherein the lower portion 20L'" has an upper leg 22 with a forward indent 27f that is proximate to a front leg 23, and the lower leg 24 has a slightly angled extension 26. The upper portion 20U is comprised of a horizontal leg 25 and a vertical leg 21. The lower portion of the bracket attaches to the golf cart and the upper portion attaches to the collection container; and FIG. 7 is a plan side view of an attachment bracket 20, shown and described in FIG. 2, wherein both leg 22 and leg 24 are substantially straight, as previously illustrated in FIG. 2.

The assembly of attachment brackets is typically used to mount the collection container on the front central dashboard area of a golf cart in front of the windshield, but not limited to this position. The attachment brackets can be designed to mount to a particular golf cart or similar vehicle.

These attachment bracket embodiments are typically a contiguous element.

In addition to securing the collection container elevated over the dashboard of the golf cart or similar vehicle, the assembly of attachment brackets also provides a leveling action for the collection container and a dampening effect that helps retain the contents of the container.

The elastic material used to make the bracket has a retention memory that allows it to stretch open and then return to its original shape, securing the container on the dashboard or another part of a golf cart or a similar vehicle. The elastic material is selected from a group consisting of but not limited to: fiberglass, graphite fiber, plastic, thermoset, elastomeric, metal or a combination thereof.

The exact bracket configuration can vary depending on the cart manufacturer and model.

The brackets allow for the container to be easily removed and replaced as needed. The top section of the bracket is attached to the container using various fastening methods. These methods can include but are not limited to rivets, binding posts, glue, hook and loop, dual lock fasteners, or other mechanical means. There are typically two brackets per assembly, located on the left and right edges on the underside of the container.

The invention includes a method for collecting broken golf tees utilizing a golf cart or a similar vehicle from a golf course. The method includes fitting each golf cart or similar vehicle with a collection container composed of a resilient shock resistant material, wherein the collection container has a planar bottom with dampened flexibility, wherein the bottom has a plurality of elliptical holes that are sufficient in size and number to drain away rain water keeping the collection container free of standing water, yet small enough to retain any fractional element of the broken golf tees, a set of fastener openings, and contiguous with the planar bottom is a perimeter wall having sections that are inclined or vertical, wherein the perimeter wall has a height that is at least one fifth as high as the bottom is wide, which is sufficient to retain broken golf tees at any slope angle the golf cart is capable of traversing or at any nominal acceleration or deceleration the golf cart is capable of operating; wherein the collection container is secured to the golf cart or the similar vehicle with a clip-on suspension assembly of attachment brackets that is composed of a resilient elastic material that enables the container to be quickly emptied by detaching and reattaching.

Furthermore the method includes, requiring all broken golf tees, which are generated during a round of golf to be collected, stored in the collection container or otherwise secured; and emptying, or otherwise cleaning, the collection containers. In a later step, the method further anticipates removing all dedicated ground mounted broken tee containers from the golf course.

It needs to be understood that it may be necessary to accommodate new or different golf cart dashboard designs, but the apparatus and method of using a collection container attached to a golf cart to collect, to carry, to re-use, and to dispose of broken golf tees will not have changed. Therefore the scope of the invention is not limited to a specific embodiment detailed in this document.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:

1. An apparatus for collecting broken golf tees utilizing a golf cart or a similar vehicle, wherein said apparatus comprises:
a collection container comprised of a resilient shock resistant material, wherein the collection container has a planar bottom that provides dampened flexibility, wherein the bottom has a plurality of elliptical holes/slots that are sufficient in size and number to drain away rain water keeping the collection container free of standing water, yet small enough to retain any fractional element of the broken golf tees, a set of fastener openings, and contiguous with the planar bottom there is a perimeter wall having sections that are inclined or vertical, wherein the perimeter wall has a height that is at least one fifth as high as the bottom is wide, which is sufficient to retain broken golf tees at any slope angle the golf cart is capable of traversing or at any nominal acceleration or deceleration the golf cart is capable of operating;
a clip-on suspension assembly of attachment brackets that is composed of a resilient elastic material, wherein each attachment bracket has a lower portion shaped similar to a counterclockwise rotated block "U" that is sized to elastically fit over and under a portion of a golf cart's dashboard or another suitably shaped part of a golf cart or a similar vehicle, wherein the lower portion is contiguous with an upper portion shaped similar to a clockwise rotated block "L", wherein a leg on the "L" is about horizontal and has one or more bracket fastener holes that are aligned with one or more fastener openings on the bottom of the collection container, when using rivets or binding fasteners, and the horizontal leg on the "L" extends rearward elevated over the golf cart's dashboard, wherein an angled section of the "L" functions as a cantilevered spring suspension support for the collection container; and
a fastening means for attaching the top section of the bracket to the container using fastening elements.

2. The apparatus according to claim 1, wherein the lower portion of the clip-on suspension assembly of attachment brackets secures the collection container to the dashboard or another suitably shaped part of a golf cart or a similar vehicle.

3. The apparatus according to claim 1, wherein the clip-on suspension assembly of attachment brackets allows the apparatus, and in particular the collection container, to be removed from and re-attached to the dashboard or another suitably shaped part, therein enabling the collection container to be quickly emptied.

4. An apparatus embodiment according to claim 1, wherein the resilient shock resistant material of the collection container is ABS, which is a polymer comprised of acrylonitrile butadiene styrene.

5. The apparatus according to claim 1, wherein the resilient elastic material of the clip-on suspension assembly of attachment brackets is selected from a group consisting of but not limited to: fiberglass, graphite fiber, plastic, thermoset, elastomeric, metal or a combination thereof, which can be expanded to provide a clamping force to the lower portion of the attachment brackets, and the upper portion of the attachment brackets provides spring suspension support to the bottom of the collection container, and taken with the dampened flexibility of the bottom and inertia of the collection container, the apparatus provides a very smooth, quiet ride, with very little vibration.

6. The apparatus according to claim 1, wherein the fastening means is selected from the group consisting of but not limited to dual lock fasteners, hook and loop, rivets, screws, bolts, brads, spring loaded mechanical fasteners, clamps, cable ties, glues, or a combination thereof.

7. The apparatus according to claim 1, wherein the fastening means is selected from the group consisting of rivets, dual lock fasteners, and hook and loop fasteners.

8. The apparatus according to claim 1, wherein the lower portion of the clip-on suspension assembly of the attachment brackets is adapted to be secured to a modified dashboard.

9. An apparatus for collecting broken golf tees utilizing a golf cart or a similar vehicle, wherein said apparatus comprises:

a collection container comprised of a resilient shock resistant material, wherein the collection container has a planar bottom with dampened flexibility, wherein the bottom has a plurality of elliptical holes/slots that are sufficient in size and number to drain away rain water keeping the collection container free of standing water, yet small enough to retain any fractional element of the broken golf tees, a set of fastener openings, and contiguous with the planar bottom there is a perimeter wall having sections that are inclined or vertical, wherein the perimeter wall has a height that is at least one fifth as high as the bottom is wide, which is sufficient to retain broken golf tees at any slope angle the golf cart is capable of traversing or at any nominal acceleration or deceleration the golf cart is capable of operating;

a clip-on suspension assembly of attachment brackets that is composed of a resilient elastic material, wherein each attachment bracket has a lower portion shaped similar to a counterclockwise rotated block "U" with an indented upper leg and an angled end lower leg, that is sized to elastically fit over and under a portion of a dashboard or another suitably shaped part of a golf cart or a similar vehicle, wherein the lower portion is contiguous with an upper portion shaped similar to a clockwise rotated block "L", wherein a leg on the "L" is about horizontal and has one or more bracket fastener holes that are aligned with one or more fastener openings on the bottom of the collection container, when using rivets or binding fasteners, and the horizontal leg on the "L" extends rearward elevated over the golf cart's dashboard, wherein an angled section of the "L" functions as a cantilevered spring suspension support for the collection container; and a fastening means for attaching the top section of the bracket to the container using fastening elements.

10. The apparatus according to claim 9, wherein the lower portion of the clip-on suspension assembly of attachment brackets secures the collection container to the dashboard.

11. The apparatus according to claim 9, wherein the clip-on suspension assembly of attachment brackets allows the apparatus, and in particular the collection container, to be removed from and re-attached to the dashboard of the golf cart or another suitably shaped part, therein enabling the collection container to be quickly emptied.

12. An apparatus embodiment according to claim 9, wherein the resilient shock resistant material of the collection container is ABS, which is a polymer comprised of acrylonitrile butadiene styrene.

13. An apparatus embodiment according to claim 9, wherein the resilient elastic material of the clip-on suspension assembly of attachment brackets is selected from a group consisting of but not limited to: fiberglass, graphite fiber, plastic, thermoset, elastomeric, metal or a combination thereof, which can be expanded to provide a clamping force to the lower portion of the attachment brackets, and the upper portion of the attachment brackets provides spring suspension support to the bottom of the collection container, and taken with the dampened flexibility of the bottom and inertia of the collection container, the apparatus provides a very smooth, quiet ride, with very little vibration.

14. The apparatus according to claim 9, wherein the fastening means is selected from the group consisting of but not limited to dual lock fasteners, hook and loop, rivets, screws, bolts, brads, spring loaded mechanical fasteners, clamps, cable ties, glues, or a combination thereof.

* * * * *